I. Sheetz,
Making Fellies.
N°2,632. Patented May 20, 1842.
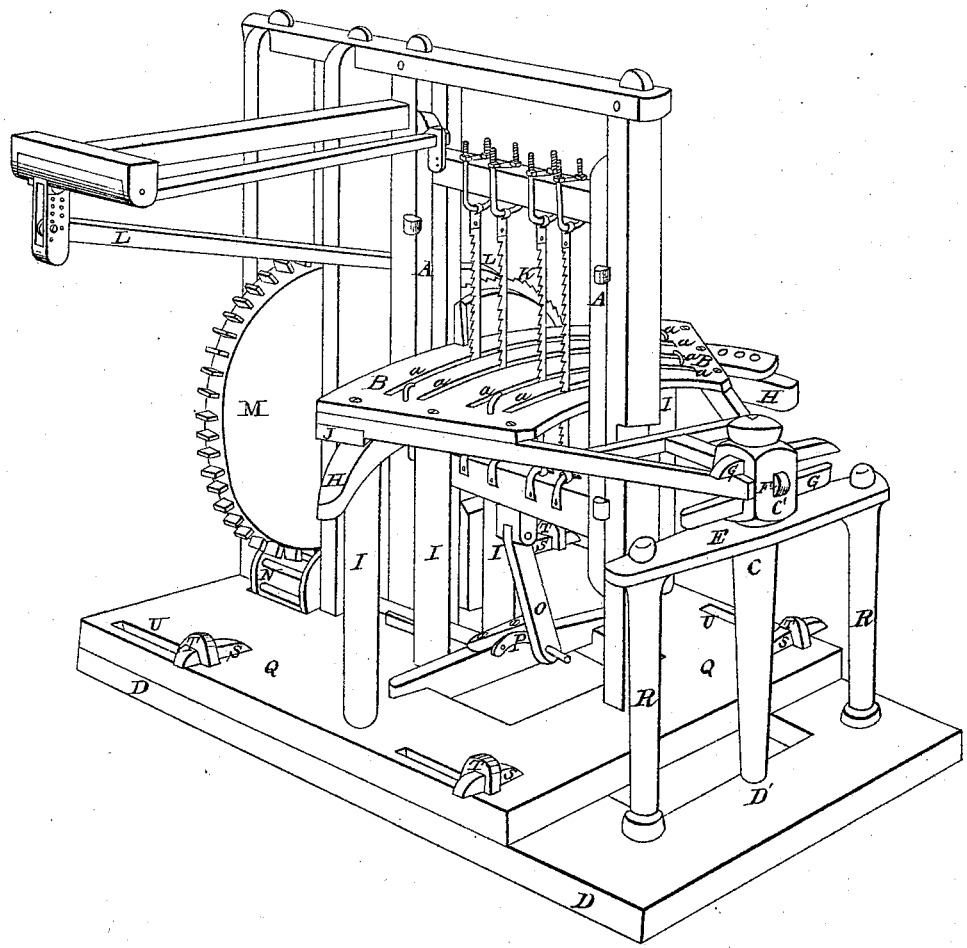

UNITED STATES PATENT OFFICE.

ISAAC SHEETZ, OF TANEYTOWN, MARYLAND.

MILL FOR SAWING FELLIES AND OTHER CIRCULAR STUFF.

Specification of Letters Patent No. 2,632, dated May 20, 1842.

*To all whom it may concern:*

Be it known that I, ISAAC SHEETZ, of Taneytown, in the county of Carroll and State of Maryland, have invented a new and improved sawmill or machine which is adapted to the sawing of fellies for wheels and stuff of other kinds which is to be cut into circular segments; and I do hereby declare that the following is a full and exact description thereof.

In the accompanying drawing, A, A, is a saw-frame, working up and down between fender posts, in the ordinary manner. This frame is represented as carrying four narrow saws, but it may be made to carry any other number that may be desired. B, B, is the carriage, which is made to move around on a center, in the following manner. C, C, is a shaft that has its lower bearing at D', in the base, or lower platform, D, D, of the machine, and its upper in a collar in the cross timber E, of the frame. F, is a piece of wood, or of metal, which is firmly attached to and makes a part of, the frame of the carriage, which piece slides in a mortise made through the head C', of the shaft C, C, and is tightened, and held in place by wedges G, G, or by any equivalent means. The front, or curved side, of the carriage is supported by, and traverses on, a stationary segment piece H, H, which is supported by columns I, I, I, rising from the upper platform Q, Q. Along the under side of the fore edge, or front, J, J, of the carriage there are pins, or cogs, projecting downward, which are acted upon by a trundle, or pinion, on the shaft of the rag-wheel K, exactly in the same manner as the carriage is moved in the ordinary saw mill; the feed hand, and arm L, L, being, also, similar to those in general use. M, is the main driving-wheel, to which motion may be given by animal power, or any other adequate power; this wheel gears into a trundle N, carrying the pitman O, of the saw frame, by means of the crank P, on its shaft. The general arrangement, so far, is very similar to that of some other sawing machines, and is not, therefore, claimed as new.

The basis of the machine consists of two frames, or platforms, an upper and a lower; the upper platform, Q, Q, has attached to it, and supports, the whole frame-work and gearing of the mill, with the exception of the crosspiece E, which is supported by pillars R, R, attached to the lower platform D. The upper platform is made to slide back and forth upon the lower, by loosening the wedges S, S, which pass through mortises in the pieces T, T, attached to the lower platform, and admitting the upper platform to be shifted upon it by the aid of the mortises U, U. When it is desired to vary the length of the radii of the curves to which the segments are to be cut, this is effected by loosening the wedges G, G, and S, S, and the upper platform may then be shifted on the lower, and the center of the carriage will also be varied, by the sliding of the piece F, in the mortise of the head C', of the shaft C, C. When this is done, the segmental curves, or slots, *a, a*, in which the saws run, will, necessarily, be changed; but, in many cases, the face piece B, B, of the carriage will admit of this being done by merely widening the slots, or curves *a, a*, toward their ends. But the carriage may be changed, or different face pieces may be adapted to the same frame, to suit different kinds of work. The stuff to be cut may be held down by screws, clamps, or other devices of a well known character, the means adopted for this purpose being varied according to circumstances. The stuff to be cut may be in several pieces, or in one single piece.

Having thus fully described the nature of my improvement in the machine for sawing fellies, and other circular segments, what I claim therein as new, and desire to secure by Letters Patent, is—

The manner in which I have combined and arranged the two lower frames, or platforms D, D, and Q, Q, and the carriage B, B, so as to allow the upper platform to shift on the lower, and the center of motion of the carriage to be changed; the same being effected in the manner, and for the purpose, herein fully set forth and made known.

ISAAC SHEETZ.

Witnesses:
THOS. P. JONES,
J. DAVIDSON.